July 21, 1964

L. J. MAYER 3,141,258

SAFETY CAPSULE FOR FISH HOOKS

Filed Sept. 24, 1962

INVENTOR.
LEONARD J. MAYER
BY
Knox & Knox

July 21, 1964    L. J. MAYER    3,141,258
SAFETY CAPSULE FOR FISH HOOKS
Filed Sept. 24, 1962    2 Sheets-Sheet 2

*INVENTOR.*
LEONARD J. MAYER
BY
*Knox & Knox*

United States Patent Office 3,141,258
Patented July 21, 1964

3,141,258
SAFETY CAPSULE FOR FISH HOOKS
Leonard J. Mayer, San Diego, Calif.
(5373 La Jolla Blvd., La Jolla, Calif.)
Filed Sept. 24, 1962, Ser. No. 225,710
4 Claims. (Cl. 43—57.5)

The present invention relates generally to fishing tackle and more particularly to a safety capsule for fish hooks.

The primary object of this invention is to provide a capsule for enclosing a fish hook in a safe manner on all occasions and particularly when in a tackle box and while the hook is in place on a rod and line being carried or stored, protecting the fisherman and/or bystander from injury by the hook during handling.

Another object of this invention is to provide a capsule containing a magnet to attract the hook and simplify insertion into the capsule, the magnet also allowing the capsule to be attached to a fishing reel having ferromagnetic metallic parts for convenience in handling and storage.

Another object of this invention is to provide a capsule which will hold a variety of sizes and types of fish hooks, securely and without damage, by means of a novel retaining structure which can also assist in opening the capsule.

A further object of this invention is to provide a capsule which is very easily applied to and removed from a fish hook, even on a pitching boat or in the usually crowded conditions of a commercial fishing vessel.

Finally, it is an object to provide a safety capsule of the aforementioned character, which is simple and convenient to manufacture and which will give generally efficient and durable service.

With these and other objects definitely in view, this invention consists in the novel construction, combination and arrangement of elements and portions, as will be hereinafter fully described in the specification, particularly pointed out in the claims and illustrated in the drawing which form a material part of this disclosure, and in which:

Similar characters of reference indicate similar or identical elements and portions throughout the specification and throughout the views of the drawings.

Figure 1:
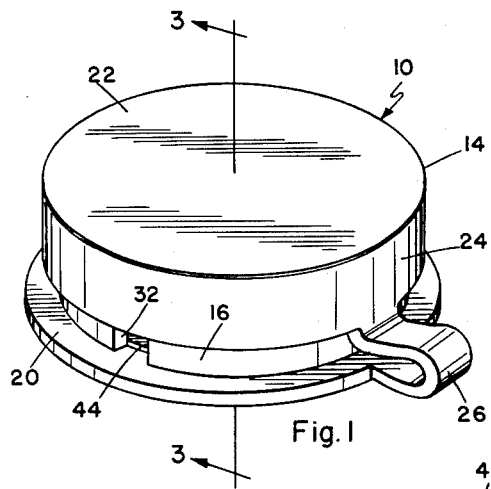
FIG. 1 is a perspective view of the capsule in closed position.
Figure 2:
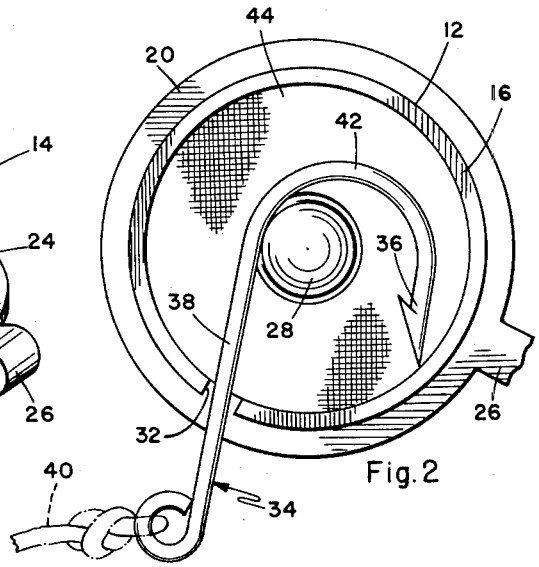
FIG. 2 is a top plan view of the capsule with the lid removed.

Referring now to FIGS. 1–4 of the drawings, the capsule indicated generally at 10, comprises a container 12 with a lid 14, the container being capable of modification in shape but illustrated as having a cylindrical wall 16 and the lower end being closed by a base or base panel 18 having a flange 20 extending radially beyond said wall. Lid 14 has a closed top 22 with a downwardly turned annular wall 24, which fits closely over the wall 16. To avoid loss or separation of the two parts, the lid 14 is connected to the container 12 by a flexible strap 26 between wall 24 and flange 20. With present methods of manufacture the entire assembly can be molded in one piece from plastic material, although other modes of construction can be used.

Figure 3:
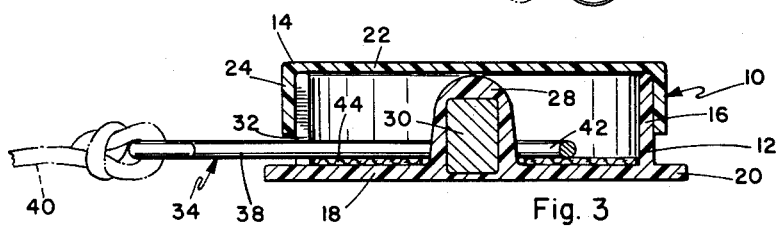
FIG. 3 is a sectional view taken on line 3—3 of FIG. 1.

In the center of base panel 18 is an upwardly projecting domed post 28 extending to or very close to the top 22 when lid 14 is in place, as in FIG. 3. Within post 28 and adjacent the base panel 18 is a magnet 30 which can be molded into the structure for simplicity. Wall 16 has a slot 32 at a convenient position, said slot being open at the upper edge of the wall. The lid wall 24 is of less depth than wall 16 so that, with the lid 14 seated firmly in place, the lower portion of slot 32 is exposed, as in FIG. 1.

A conventional fish hook 34 can be inserted into container 12 with the hook portion 36 looped around post 28 and the shank 38 extending outwardly through slot 32, the leader 40 remaining attached to the hook. When the lid 14 is pressed into place, the hook is securely held and cannot ride up over post 28 or become disengaged therefrom, since the freedom of movement is so limited. However, slot 32 can be of considerable width and the dimensions of the capsule be sufficient to accommodate large hooks, yet still be able to hold small hooks due to the locking and confining action of post and slot. As long as the radial distance between post 28 and the wall 16 is less than the length of the hook portion 36 from the looped and/or bight portion 42 to the point, the hook cannot become disengaged from the post while the lid is in place. Since the lid 14 is dimensioned to leave the lower portion of slot 32 open, the hook shank 38 does not interfere with proper seating of the lid. The capsule may be left in place during the storage of the tackle and, to prevent corrosion of the hook, a pad 44 is inserted into container 12 and impregnated with oil, said pad being a close fit inside wall 16 and thus easily retained without special securing means.

When a hook is inserted into the container 12, magnet 30 attracts the hook and holds it in place around post 28 while the lid is closed. This greatly facilitates handling under adverse conditions, such as in the crowded conditions of a commercial or sport fishing boat. In addition to holding the hook, magnet 30 will secure the capsule 10 to a metallic portion of the fishing rod reel so preventing the capsule from swinging free and perhaps entangling the leader and line on some obstruction. This is particularly advantageous when carrying and storing the tackle and allows the hook to be kept in readiness for immediate use.

Figure 4:
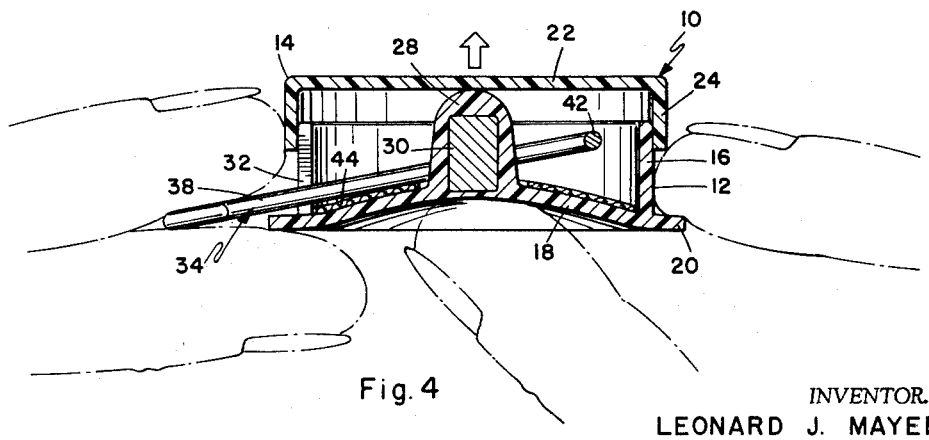
FIG. 4 is a sectional view similar to FIG. 3, showing the method of opening the capsule.

With the capsule molded from plastic material it is a simple matter to remove the lid. As illustrated in FIG. 4, the flange 20 is gripped and the base panel 18 is pushed upwardly by one thumb. The post 28 then forces the lid 14 off easily, the base panel 18 having sufficient resiliency to allow ample displacement for the purpose when made from the type of plastic normally used for such items. This avoids the necessity for gripping the lid 14 with the fingernails under the edge of wall 24 and makes it possible for the lid to be a reasonably tight fit to prevent inadvertent displacement.

Thus by a novel combination of a domed post element and a slotted walled container with a close fitting lid which leaves part of the slot clear, various fish hooks can be safely enclosed while still attached to the line, yet be ready for instant use when necessary without fumbling with the lid. The magnet adds considerably to the usefulness of the capsule and facilitates handling.

Figure 5:
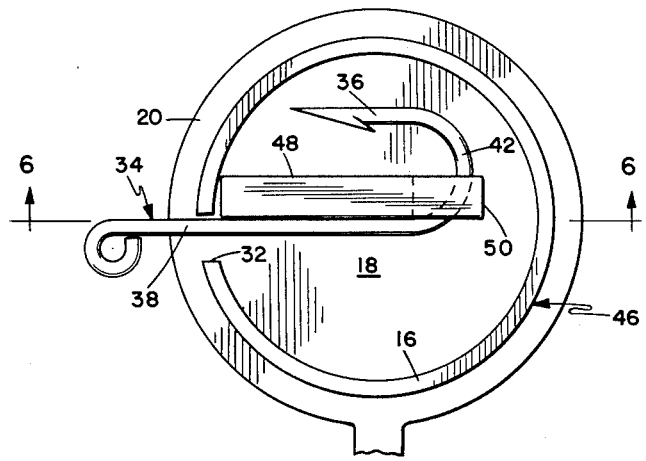
FIG. 5 is a view similar to FIG. 2, illustrating an alternative magnet configuration.
Figure 6:
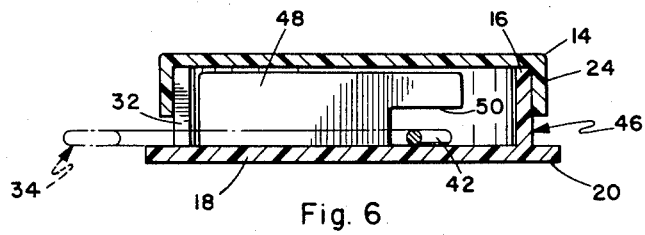
FIG. 6 is a sectional view taken on line 6—6 of FIG. 5.

An alternate magnet arrangement is illustrated in FIGS. 5 and 6, wherein the container 46 is similar to that described above, with a wall 16, base panel 18, flange 20 and a slot 32 in the wall, but the central post is omitted. Instead, a magnetic post 48 of elongated bar-like form is fixed to the base panel 18 and extends from adjacent slot 32 substantially diametrically across the container. The end of magnetic post 48 remote from the slot 32 is spaced from the wall 16 and is undercut to provide a tongue portion 50. A fish hook 34 can then be engaged over magnetic post 48 and under the tongue portion 50, with the shank 38 extending through slot 32. When lid 14 is fitted over container 46, the hook 34 is securely held against displacement as before.

The magnetic post 48 is preferably substantially the same height as wall 16, as indicated in FIG. 6, to prevent disengagement of the hook over the top and can thus be used to start the removal of lid 14 in the manner illustrated in FIG. 4.

It is understood that minor variations from the form of the invention disclosed herein may be made without departure from the spirit and scope of the invention, and that the specification and drawings are to be considered as merely illustrative rather than limiting.

I claim:

1. A safety capsule for a fish hook, comprising;
   a cylindrical container having a base and an upwardly extending peripheral wall there being a slot in said wall open at the top thereof;
   an upright magnetic post on said base around which a fish hook can be engaged;
   said wall being shaped so the shank of a fish hook may extend from the container through said slot;
   a lid having a downwardly extending wall for a close fit over said container wall;
   said lid wall having a depth less than that of said container wall, whereby a portion of said slot remains exposed when the lid is seated on the container;
   said post extending in close proximity to said lid to prevent passage of a hook between the post and lid when the lid is seated;
   said base having a flange extending substantially radially beyond said container wall;
   and said base being resilient, whereby said post can be pushed upwardly to displace said lid.

2. A capsule according to claim 1 in which said magnetic post comprises a magnet contained within said post.

3. A capsule according to claim 2 wherein said magnet is closely adjacent to said base.

4. A capsule according to claim 1 and including an oil containing pad within said container.

References Cited in the file of this patent

UNITED STATES PATENTS

| | | |
|---|---|---|
| 1,561,330 | Keller | Nov. 10, 1925 |
| 1,601,945 | Davis | Oct. 5, 1926 |
| 1,624,233 | Griffin | Apr. 12, 1927 |
| 1,634,030 | Korkames | June 28, 1927 |
| 1,733,971 | Kremer | Oct. 29, 1929 |
| 1,850,074 | Crandall | Mar. 22, 1932 |
| 2,219,454 | Reilly | Oct. 29, 1940 |
| 2,657,497 | Beaver | Nov. 3, 1953 |
| 2,831,289 | Klinghoffer | Apr. 22, 1958 |
| 2,849,825 | Reisner | Sept. 2, 1958 |
| 2,999,621 | Kiser | Sept. 12, 1961 |

FOREIGN PATENTS

| | | |
|---|---|---|
| 795,619 | France | Jan. 8, 1936 |